(12) United States Patent
Thenander et al.

(10) Patent No.: US 11,904,740 B2
(45) Date of Patent: Feb. 20, 2024

(54) CHILD SAFETY ASSEMBLY

(71) Applicant: Axkid AB, Gothenburg (SE)

(72) Inventors: Robert Thenander, Nygård (SE); Daniel Lundgren, Mölndal (SE); David Röstedal, Jönköping (SE)

(73) Assignee: AXKID AB, Gothenburg (SE)

( * ) Notice: Subject to any disclaimer, the term of this patent is extended or adjusted under 35 U.S.C. 154(b) by 150 days.

(21) Appl. No.: 17/425,376

(22) PCT Filed: Jan. 30, 2020

(86) PCT No.: PCT/EP2020/052319
§ 371 (c)(1),
(2) Date: Jul. 23, 2021

(87) PCT Pub. No.: WO2020/157213
PCT Pub. Date: Aug. 6, 2020

(65) Prior Publication Data
US 2022/0097578 A1 Mar. 31, 2022

(30) Foreign Application Priority Data
Jan. 30, 2019 (EP) .................................... 19154531

(51) Int. Cl.
*B60N 2/28* (2006.01)

(52) U.S. Cl.
CPC ......... *B60N 2/2887* (2013.01); *B60N 2/2821* (2013.01); *B60N 2/2863* (2013.01); *B60N 2/2875* (2013.01)

(58) Field of Classification Search
CPC .. B60N 2/2887; B60N 2/2884; B60N 2/2821; B60N 2/2863; B60N 2/2875
See application file for complete search history.

(56) References Cited

U.S. PATENT DOCUMENTS

| 6,139,099 A * | 10/2000 | Skold | B60N 2/28 297/250.1 |
| 7,887,129 B2 * | 2/2011 | Hei | B60N 2/2848 297/256.16 |

(Continued)

FOREIGN PATENT DOCUMENTS

| EP | 0485121 A1 | 5/1992 |
| EP | 0878347 A1 | 11/1998 |
| SE | 504732 C2 | 4/1997 |

OTHER PUBLICATIONS

International Search Report (PCT/ISA/210) and Written Opinion (PCT/ISA/237) datedApr. 28, 2020, by the European Patent Office as the International Searching Authority for International Application No. PCT/EP2020/052319.

*Primary Examiner* — Philip F Gabler
(74) *Attorney, Agent, or Firm* — BUCHANAN, INGERSOLL & ROONEY PC

(57) ABSTRACT

The present inventive concept relates to a child safety assembly. The child safety assembly comprises: a base portion, to be placed on a vehicle seat and for holding a child safety seat and a brace, to be pressed against a backrest of the vehicle seat. The brace being connected to the base portion, for preventing the base portion from tilting from the vehicle seat. The child safety assembly further comprises tensioning means, extending from the brace and secured to the base portion, and a biasing mechanism, coupled to the tensioning means. The biasing mechanism provides, to the tensioning means, a tension which draws the brace in a direction downwards to the base portion for providing a pressure of the brace against the backrest of the vehicle seat.

14 Claims, 5 Drawing Sheets

(56) References Cited

U.S. PATENT DOCUMENTS

| | | | |
|---|---|---|---|
| 9,061,611 B2 * | 6/2015 | Love | B60N 2/2863 |
| 9,452,695 B2 * | 9/2016 | Sedlack | B60N 2/2875 |
| 10,112,550 B2 * | 10/2018 | Nickel | B60N 2/2824 |
| 10,479,237 B2 * | 11/2019 | Saint | B60N 2/286 |
| 10,766,385 B2 * | 9/2020 | Mason | B60N 2/2851 |
| 10,780,800 B2 * | 9/2020 | Kaiser | B60N 2/2821 |
| 11,077,775 B2 * | 8/2021 | Bennett | B60N 2/286 |
| 2005/0253431 A1 | 11/2005 | Hei et al. | |
| 2008/0303321 A1 * | 12/2008 | Powell | B60N 2/2845 297/216.11 |
| 2008/0315647 A1 * | 12/2008 | Carine | B60N 2/2863 297/250.1 |
| 2016/0200225 A1 * | 7/2016 | Van Der Veer | B60N 2/2863 297/256.16 |
| 2020/0331368 A1 * | 10/2020 | Cohen | B60N 2/504 |

* cited by examiner

US 11,904,740 B2

CHILD SAFETY ASSEMBLY

TECHNICAL FIELD OF THE INVENTION

The present inventive concept relates to a child safety assembly, and more particularly, to a child safety assembly for supporting a child seat which is placed in a counter direction of travel.

BACKGROUND OF THE INVENTION

A child should preferably be placed in a rear facing position in the vehicle in order to reduce the force acting on the child's neck in case of an accident. The term rear facing position should herein and henceforth be understood as a backward facing position seen from the driver's seat. The securing of a child seat in a rear facing position may be made to a child safety assembly. A child safety assembly may typically comprise a base portion with ISOFIX connections, an anti-rebound brace, and a back leg. All parts of the child safety assembly must securely be connected to the interior of the vehicle. The back leg is a support that prevents the child safety seat from tilting while the ISOFIX connections make the child safety seat properly connected to the vehicle seat and prevent movement of the child safety seat in case of an accident from slipping in a horizontal direction. In case of an accident the brace prevents a rotating motion of the child safety seat against the vehicle seat. Furthermore, the brace may have a shock absorbing function by absorbing an impact from the backrest in case of an accident. It would be desirable to further improve the securing of a child safety assembly to the vehicle seat.

SUMMARY OF THE INVENTION

An object of the inventive concept is to provide an improved child safety assembly. This, and other objects, which will become apparent in the following, are accomplished by means of a child safety assembly comprising a brace adapted to be pressed against a vehicle seat by means of tensioning means connected to the brace and a biasing mechanism, coupled to the tensioning means, defined in the accompanying claims. The present inventive concept is based on the insight that fastening of a child safety assembly, comprising a brace, to a vehicle seat can be made with higher precision and better security, if the brace is automatically drawn in a downward direction by means of a tensioning means, such that the brace is pressed against the vehicle seat.

According to at least a first aspect of the present inventive concept, a child safety assembly to be placed on a vehicle seat counter to the direction of travel is provided. The child safety seat comprises:

a base portion, to be placed on a vehicle seat and for holding a child safety seat, a brace, to be pressed against a backrest of the vehicle seat, said brace being connected to said base portion, for preventing said base portion from tilting from the vehicle seat, tensioning means, extending from said brace and secured to said base portion, and a biasing mechanism, coupled to said tensioning means, wherein said biasing mechanism provides, to said tensioning means, a tension which draws said brace in a direction downwards to said base portion for providing a pressure of said brace against the backrest of the vehicle seat.

Hereby, the biasing mechanism provides a tension to the tensioning means. Since the tensioning means are coupled to both the base portion and the brace, the tension of the tensioning means acts like a force that draws the brace in a downward direction. Moreover, the brace may have an angular shape such that the upper part of the brace is tilted against the backrest of the vehicle seat. Then, due to the force that draws the brace in the downward direction, a pressure between the brace and the backrest of the vehicle seat is achieved. The biasing mechanism thus indirectly, via the tensioning means, contribute to the pressure between the brace and the backrest of the vehicle seat. Hence, there is a relationship between the base portion, the tensioning means coupled to the base portion and the brace, and the biasing mechanism which provides a tension to the tensioning means. This relationship has the effect that the brace and the child safety assembly is tightly secured to the backrest of the vehicle seat and that the child safety assembly is secure in the case of a vehicle accident.

It should be understood that the brace could also be referred to as a bracket or an anti-rebound bracket.

According to one example embodiment, the biasing mechanism comprises a movable component, adapted for rolling up said tensioning means, such that the length of said tensioning means between said movable component and said base portion is shortened, or for unrolling said tensioning means, such that the length of said tensioning means between said movable component and said base portion is extended.

Hereby, the tension of the tensioning mechanism is adjustable by changing the length of the tensioning means. The tension of the tensioning means is dependent of its length which can be altered. By increasing the length of the tensioning means the tension of the tensioning means is decreased and by decreasing the length of the tensioning means the tension of the tensioning means is increased. Thus, by regulating the length of the tensioning means, the pressure of the brace against the backseat of the vehicle is altered.

Having a length of the tensioning means that can be altered makes it possible to adapt the child security assembly to various vehicle seats, independent of the shape or size of the vehicle seat. In addition, it is possible to secure the child security assembly to the vehicle seat independently of the tilting angle of the backrest of the vehicle seat. Hence, the user does not need to adjust the vehicle seat before the child safety assembly is installed.

In one example embodiment, the movable component is located within the brace. Hereby, the movable component and the tensioning means attached to the movable component are protected from environmental impact.

In one example embodiment, the movable component is a rotating component. Having a movable component which is able to rotate enhances the ability of the tensioning means to be rolled up or unrolled of the movable component.

According to one example embodiment, the movable component is a wheel and wherein said wheel is spring loaded, such that said tensioning means is urged to be automatically rolled up around said wheel.

Hereby, there is automatically a pressure provided between the brace and the backrest of the vehicle seat. This pressure is provided since the tensioning means is automatically rolled up on the wheel. As a consequence, the child safety assembly is automatically tightly secured to the backrest of the vehicle seat, with improved security of the child safety assembly as a result.

The fact that the tensioning means is automatically rolled up around the wheel reduces the risk of jamming of the tensioning means.

In addition, the brace is placed to the backrest of the vehicle seat without manual impact. The initial pressure between the backrest of the vehicle seat and the brace is not person dependent.

Since the tensioning means is automatically rolled up around the wheel, a pressure of the brace against the backrest of the vehicle seat is automatically provided. Hence, the child safety assembly is easy to install.

According to one example embodiment, said biasing mechanism automatically provides a tension to said tensioning means, and wherein said biasing mechanism further comprises a manual regulator, for additional tensioning of said tensioning means.

Hereby, the brace is adapted to be tightened to the backrest of the vehicle seat as a result of both automatic influence and by manual influence.

The tensioning means is automatically provided with a tension supplied by the biasing mechanism. Thereby, the brace is automatically tightened to the backrest of the vehicle seat. The tightening of the brace against the backrest of the vehicle seat is further improved by the manual tensioning of the tensioning means. As a consequence, the brace is tightly connected to the backrest of the vehicle seat and the pressure between these two are increased compared to a brace supplied with only automatic tensioning. As a consequence, the child safety assembly will be well anchored to the vehicle seat and thus increases the safety in case of an accident.

In one example embodiment, the automatic tensioning of the tensioning means and the manual tensioning of the tensioning means are performed in two successive steps. In the first step, the automatic tensioning of the tensioning means is made. In the next step, the tension of the tensioning means is further improved by manual tensioning, via the manual regulator.

According to one example embodiment, said manual regulator is connected to said movable component, and wherein activation of said manual regulator causes said tensioning means to be further rolled up around said movable component, such that said brace is further drawn in a direction downwards to said base portion and the pressure of said brace against the backrest of the vehicle seat is increased Hereby, the rolling up of the tensioning means around the movable component is both automatically enforced and manually enforced by activation of the manual regulator.

When the user activates the manual regulator, the tensioning means is tightened and the brace is pressed further against the backrest of the vehicle seat.

In one example embodiment, the manual regulator is a knob adapted for the user to rotate in order to tighten the brace against backseat. The knob may be connected to a first gear wheel. The first gear wheel may be in contact with a second gear wheel arranged on the movable component. Consequently, rotation of the knob causes the first gear wheel to rotate which in turn causes the second gear wheel to rotate such that the movable component is rotating. This maneuver of the knob causes the tensioning means to be tightened and the brace to be further pressed against the backrest of the vehicle seat.

In one example embodiment, the child safety assembly comprises a releasable child safety seat. Hereby, the user may connect a child safety seat adapted for the specific age, length or weight of the child to use the child safety assembly.

In one example embodiment, the child safety assembly comprises a fixed child safety seat.

In one example embodiment, the manual regulator is located such that a child sitting in the child safety seat is prevented from reaching it, e.g. at the top of the brace or on the backside of the brace seen from the child safety seat.

According to one example embodiment, said manual regulator comprises a torque overload protector which, when a predefined torque is reached, decouples the manual regulator from additional tensioning of the tensioning means.

Hereby, the tension of the tensioning means is limited and the user is assured that the brace is tightened to the backrest of the vehicle seat with sufficient pressure for preventing rotation of the child safety assembly around the vehicle seat. I.e. the user can be sure that the brace is safely attached to the vehicle seat.

Furthermore, the pressure of the brace against the pressure of the vehicle seat is prevented from being too high. It also functions as a safety mechanism for avoiding breaking the biasing mechanism and/or the tensioning means.

Hereby, it is easy for the user to install the brace. Furthermore, the user does not need to worry about how much activation the manual regulator needs for installation.

In one example embodiment, the stop of rotation is regulated by a pre-defined torque of the wheel.

According to one example embodiment, said manual regulator comprises indicating means, said indicating means giving a response when said predefined torque is reached, such that the user knows when to stop activating said manual regulator, and for preventing overload of said tensioning means.

Hereby, the user knows when to stop the activation of the manual regulator and when the brace is pressed enough against the backrest of the vehicle seat.

In one example embodiment, the activation of the manual regulator has no effect after the response from the indicating means. I.e. the activation of the manual regulator provides no further tensioning of the tensioning means as the activation has no longer effect on the tensioning means.

According to one example embodiment, said indicating means comprises a sound for indication to the user when to stop activating said manual regulator.

Hereby, the user is able to hear that the tensioning means is enough tightened. The risk that the tensioning means is overloaded is decreased. The sound could be a click sound or a digital sound.

According to one example embodiment, said base portion further comprises:

a pair of ISOFIX latches, adapted to be connected to a pair of ISOFIX connections of the vehicle seat, and a supporting leg, to be supported against the floor of the vehicle.

Hereby, the child safety assembly is well secured to the vehicle seat.

According to one example embodiment, said brace is pivotally connected to said base portion at a first location spaced apart from a second location where said tensioning means is secured to said base portion, such that said brace can be tilted towards or away from said base portion.

Hereby, the brace and the base portion are coupled by a pivot connection point and the tensioning means and the base portion are coupled by a securing connection point.

In one example embodiment, the second location is closer to the backrest of the vehicle seat, when the child safety assembly has been mounted on the vehicle seat.

Hereby, the brace is tiltable relative the base portion. This feature makes it easy for the user to install the child safety assembly in the vehicle or to remove the child safety assembly from the vehicle. In addition, it is easier to attach the ISOFIX connections when the brace is in a tilted position than in a non-tilted position.

Furthermore, tilting of the brace enhances the transportation of the child safety assembly, since it occupies less space in a tilted configuration. In one example embodiment, during tilting of the brace it is advantageous to have a tensioning means, the length of which is extendable or can be retracted.

It should be understood that brace refers to a bracket which prevents the child safety assembly from rotating relative the vehicle seat. The brace should not be prevented from rotating relative the base portion of the child safety assembly.

In one example embodiment, the distance between the pivot connection points and the security points can be altered. In one example embodiment, the brace comprises a pair of first length portions, each first length portion having a first end portion pivotally connected to the base portion at the first location. The pair of first length portions may extend along the base portion such that the pair of first length portions and the base portion are aligned.

In one example embodiment, the brace comprises a second length portion shaped as a U-shape. The second length portion may be angled relative the pair of first length portions. E.g. the second length portion may be substantially aligned with the backrest of the vehicles seat when the child safety assembly is inserted in the vehicle. Each end of the second length portion may be connected to the respective pair of first length portions. The second length portion may be connected with the tensioning means at the second location. Hereby, the brace comprises two arms extending along the base portion.

According to one example embodiment, the base portion comprises a pair of rails and wherein said brace is connected to respective rail at the first location and wherein the tensioning means are connected to respective rail at the second location.

According to one example embodiment, said biasing mechanism further comprises a lock, adapted to prevent said tensioning means from being unrolled of said movable component.

Hereby, the tension of the tensioning means is kept constant as long as the lock is activated. When the lock is released, the tension of the tensioning means is also released.

In one example embodiment, the lock is released when the brace is to be tilted such that the length of the tensioning means between the movable component and the base portion is extendable.

The lock prevents the tensioning means from being unrolled from the movable component when the brace is securely attached to the vehicle seat. Furthermore, the lock provides a security that the brace is kept in pressure to the backrest of the vehicle seat.

In one example embodiment, the lock is located on the brace at a position such that child is unable to reach the lock. Hereby, the child is prevented from playing with the lock and unintentionally release the lock.

According to one example embodiment, said lock is adapted to be automatically locked and manually unlocked such that a release of said biasing mechanism is controllable by a user.

Hereby, the brace is automatically locked and the user does not need to worry about it becoming unlocked. Once the tensioning means is tensed, the brace is pressed against the backrest of the vehicle seat and locked in this position due to the lock.

Hereby, the tensioning means is automatically locked when it is rolled up around the movable component. In addition, the unlocking of the tensioning means makes the release of the child safety assembly easy in that the brace is tiltable when the tensioning means is without tension.

According to one example embodiment, said tensioning means comprises at least one strap.

One end of the strap may be secured to the base portion and one end may be attached to the movable component of the biasing means and being rolled up around the movable component.

According to one example embodiment, said tensioning means are at least partly encompassed within said brace.

The tensioning means are therefore protected from environmental impact. This makes the tensioning means protected for example during transportation of the child safety assembly. Furthermore, the child is not in contact with the tensioning means. Thus, the child is prevented from playing with the tensioning means or accidentally break it or destroy its function.

According to one example embodiment, said brace is shaped as a tubular profile and wherein said tensioning means are at least partly encompassed within said tubular profile.

Hereby, the tensioning means is protected within the brace.

In one example embodiment, a portion of the tensioning means is located outside the brace.

In one example embodiment, the portion of the tensioning means located outside the tubular profile of the brace is secured to the base portion.

BRIEF DESCRIPTION OF THE DRAWINGS

The present inventive concept will now be described in more detail, with reference to the appended drawings showing example embodiments, wherein.

DETAILED DESCRIPTION OF THE DRAWINGS

In the following description, the present inventive concept is described with reference to a child safety arrangement comprising a base portion, a brace, tensioning means, and a biasing mechanism.

Figure 1:
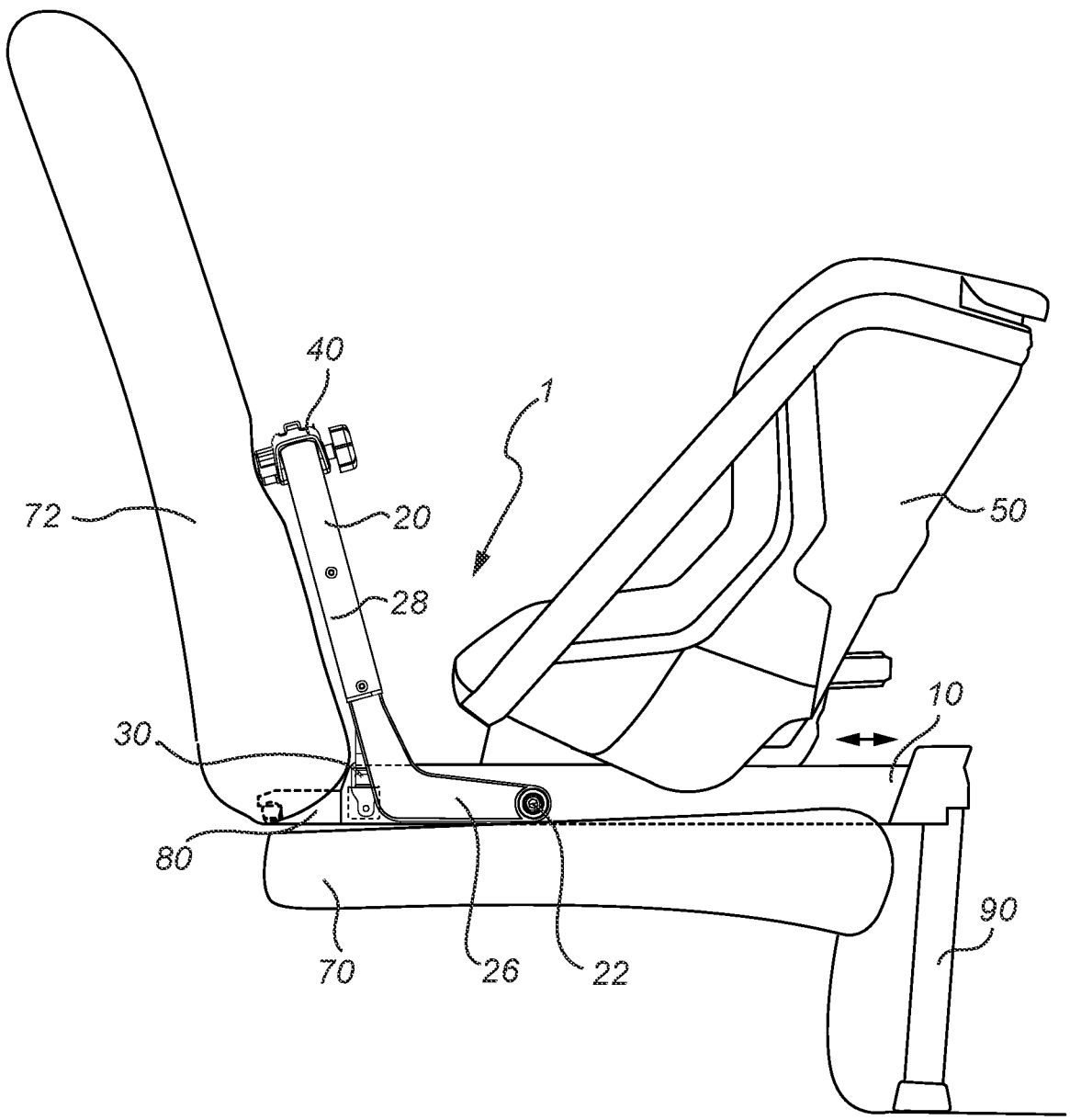
FIG. 1 illustrates a side view of a child safety assembly according to at least one example embodiment of the inventive concept.

FIG. 1 illustrates a child safety assembly 1. The child safety assembly 1 comprises a base portion 10, placed on a vehicle seat 70. The base portion 10 holds, in a rear facing position, a child safety seat 50 which may be releasably connected to the base portion 10. The base portion 10 may be connected to the vehicle seat 70 by a pair of ISOFIX latches 80. The child safety assembly 1 further comprises a supporting leg 90 which is connected to the base portion 10 and which acts as a support for the base portion 10. The supporting leg 90 being pressed against the floor of the vehicle.

The child safety assembly 1 further comprises a brace 20 to be pressed against the backrest 72 of the vehicle seat. Similar to the supporting leg 90, the brace 20 acts as a support for the base portion 10 and the brace 20 prevents the base portion 10 from tilting from the vehicle seat 70 in case of an accident. The brace 20 has the shape of an angular profile with a first length portion 26 extending, substantially parallel, along the base portion 10. An end of the first length portion 26 is, in FIG. 1, pivotally connected to the base portion 10 at a first location 22. The brace 20 is thus able to pivotally rotate relative the base portion 10 at the first location 22. When the child safety assembly 1 is to be inserted into the vehicle tilted, the brace 20 may be tilted against the base portion 10 for easier installation.

It should be understood that the brace according to the inventive concept does not need to have a U-shaped profile. Other shapes are possible, such as an arm, a bar or a T-shaped plate connected to the base portion.

The brace, in FIG. 1, further has a second length portion 28 connected to the first length portion 26. The second length portion is U-shaped and extends along the backrest 72 of the vehicle seat. Within the second length portion 28, tensioning means 30 are arranged. The tensioning means 30 are coupled to both the brace 20 and the base portion 10 and have a tension that forces the brace 20 in a downward direction. Consequently, the brace 20 is pressed against the backrest 72 of the vehicle seat. The higher the tension of the tensioning means 30, the higher will the pressure be between the brace 20 and the backrest 72 of the vehicle seat.

FIG. 1 also illustrates a biasing mechanism 40 connected to the brace 20 and the tensioning means 30.

Figure 2:
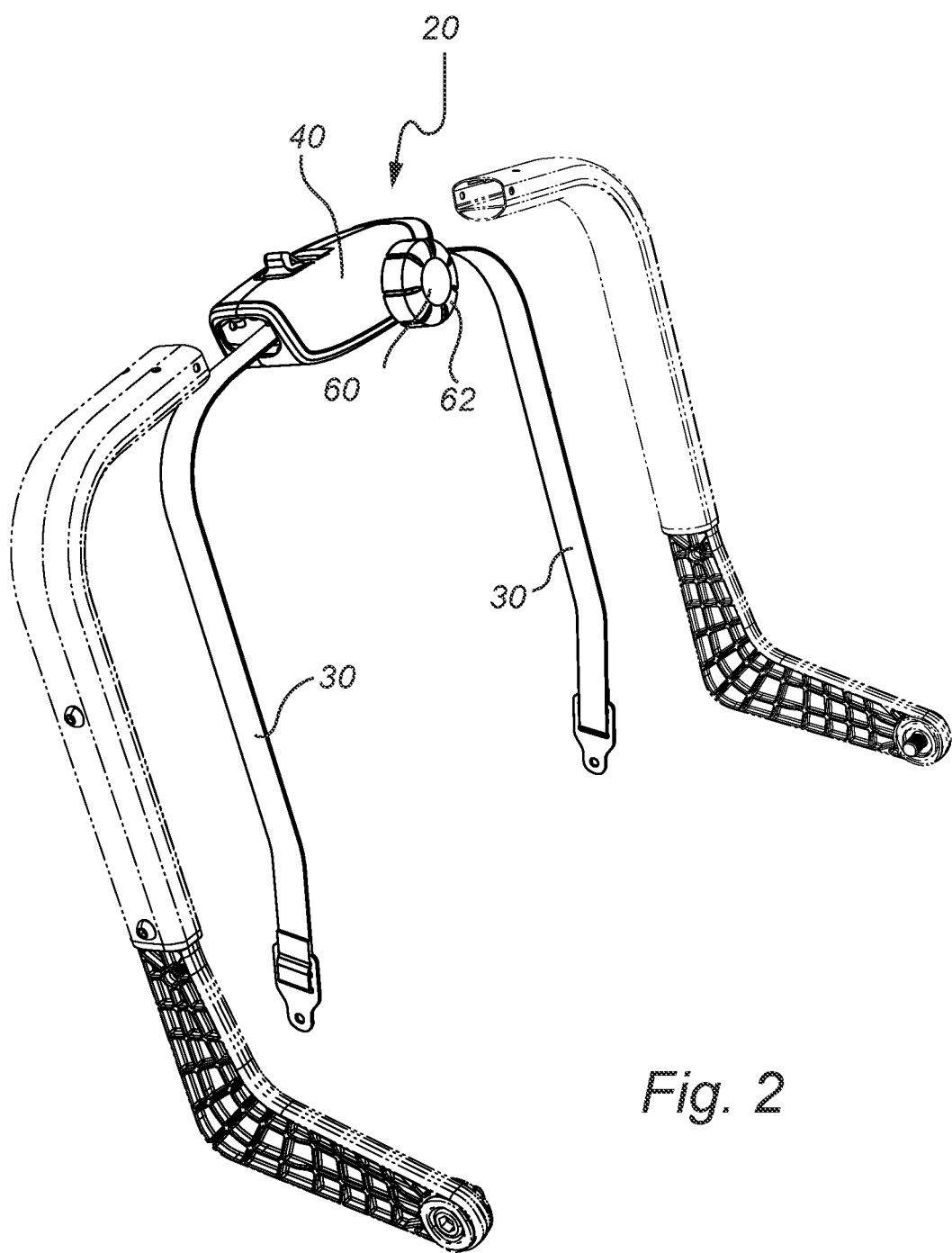
FIG. 2 illustrates, in a partly exploded view, a brace, tensioning means, and the exterior of a biasing mechanism according to at least one example embodiment of the inventive concept.
Figure 3:
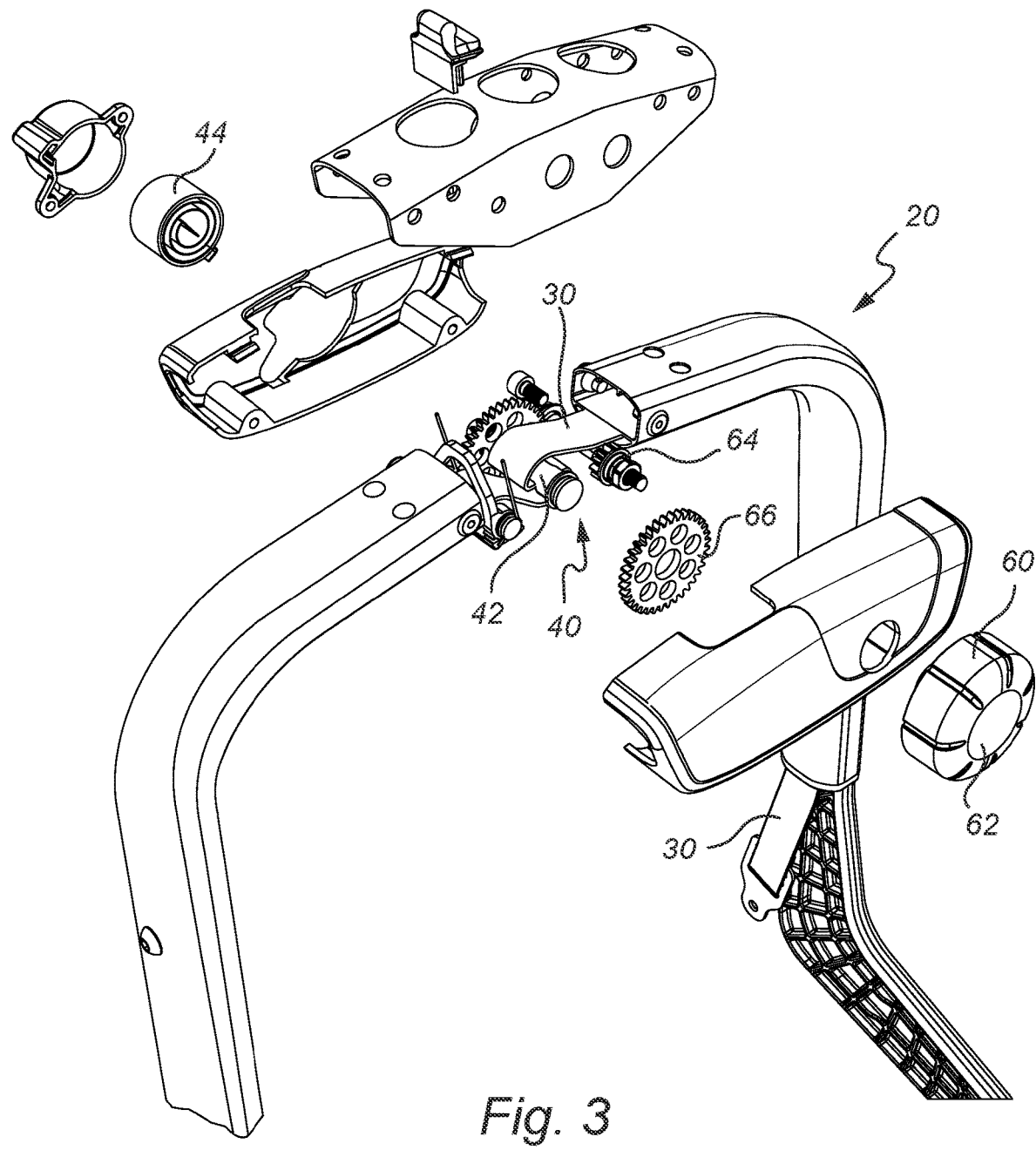
FIG. 3 illustrates the interior of a biasing mechanism comprising a movable component and a manual regulator according to at least one example embodiment of the inventive concept.

FIGS. 2 and 3 illustrate a brace 20 and tensioning means 30, in the shape of a strap, connected to a biasing mechanism 40. The biasing mechanism 40 comprises a movable component 42 which the tensioning means 30 are connected to and which the tensioning means 30 are arranged to be rolled around. The movable component 42 is located at the interior of the biasing mechanism 40. A spring 44, connected to the movable component 42, provides the tensioning means 30 to be automatically rolled up around the movable component 42.

The biasing mechanism 40 further comprises a manual regulator 60. The manual regulator 60 is arranged to manually adjust the tension of the tensioning means 30 and is located on the top of the brace 20. By activation of the manual regulator 60, the tension of the tensioning means is increasing.

Activation of the manual regulator comprises rotation of a knob 62 located on the outside of the biasing mechanism 40. The manual regulator 60 further comprises a first gear wheel 64 which is in connection with a second gear wheel 66 connected to the movable component 42. When the user activates the manual regulator, the first gear wheel 64 having a smaller diameter than the second gear wheel, provides a gear change to the second gear wheel. Hereby, the user can use reduced force in order to tension the brace 20 against the backrest 72 of the vehicle seat. Activation of the manual regulator 60 thus makes the tensioning means 30 to be further rolled up around the movable component 42. When the user rolls up the tensioning means 30, the length of the tensioning means between the base portion 10 and the biasing mechanism 40 decreases and consequently the tensioning of the tensioning means 30 increases.

Figure 4A:
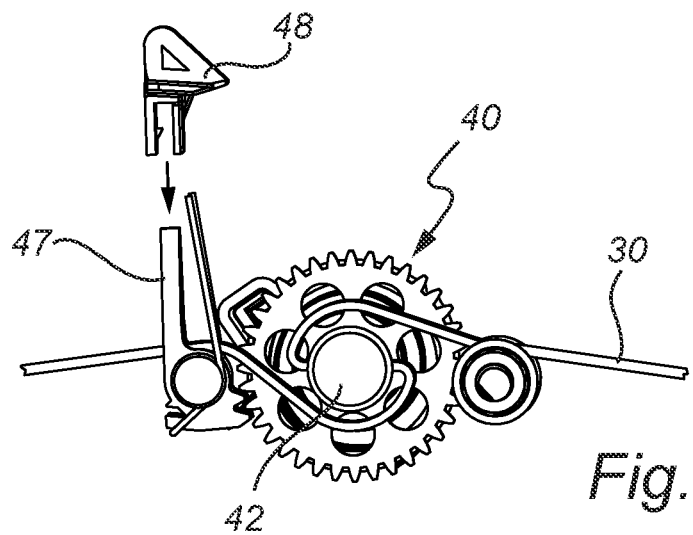
FIG. 4a is a detailed view of FIG. 4.
Figure 4:
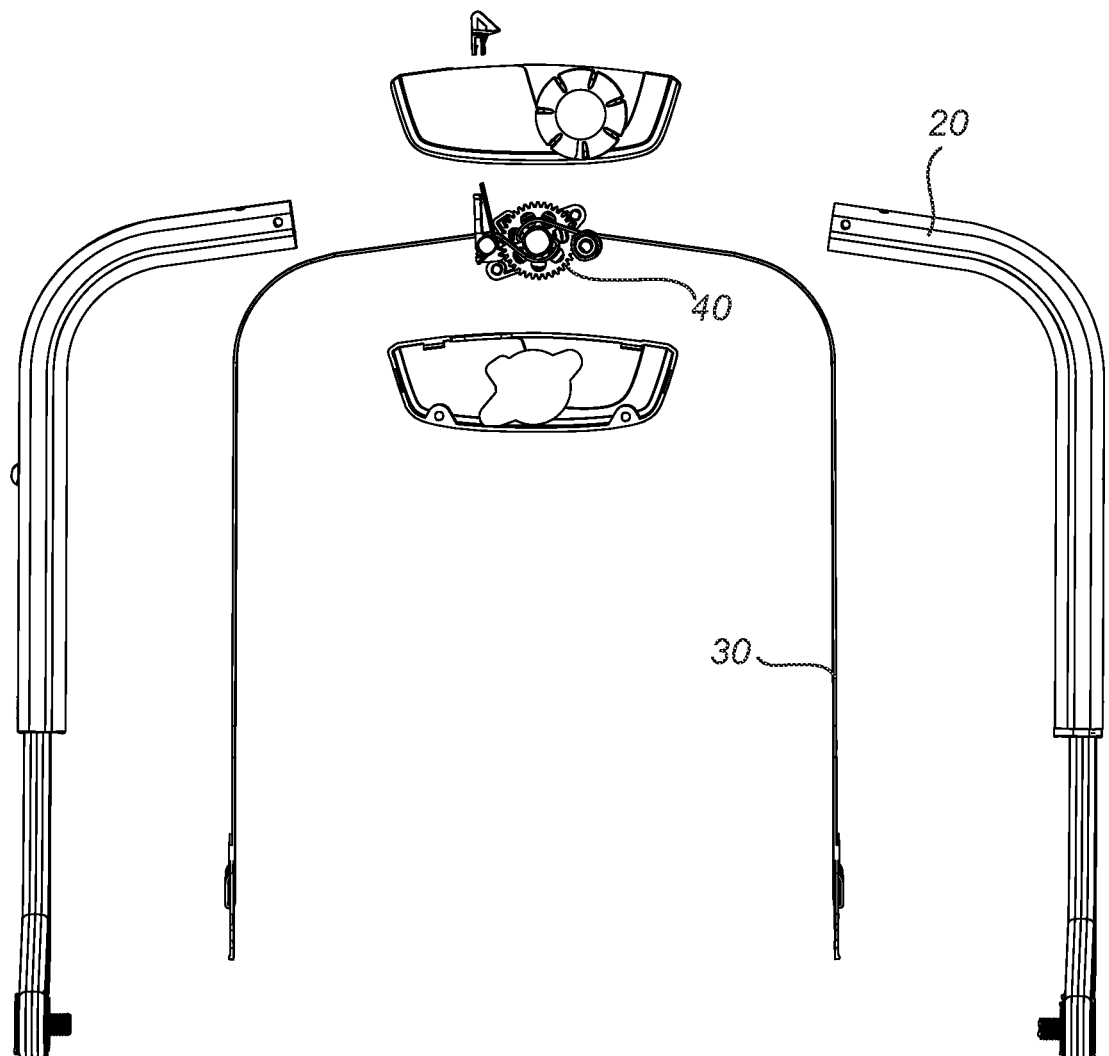
FIG. 4 illustrates, in a partly exploded view, a brace, tensioning means, and a biasing mechanism according to at least one example embodiment of the inventive concept.

FIGS. 4 and 4a illustrates, in a partly exploded view, a brace 20 and tensioning means 30 connected to a biasing mechanism 40. The biasing mechanism 40 comprises a movable component 42 which the tensioning means 30 are connected to and arranged for the tensioning means 30 to be rolled up around. The biasing mechanism 40 further comprises a lock 47 which prevents the tensioning means 30 from unrolling the movable component 42. The lock 47 is manually adjustable by a hand lever 48 located on the outside of the biasing mechanism 40. By regulating the hand lever 48 the lock 47 is released whereupon the tensioning means 30 is adapted to be unrolled of the movable component 42. The lock 47 is adapted to secure that the tension of the tensioning means 30 is kept at a constant level as long as the child security assembly 1 is in use. By releasing the lock 47 the user may tilt the brace 20 against the base portion 10.

Figure 5:
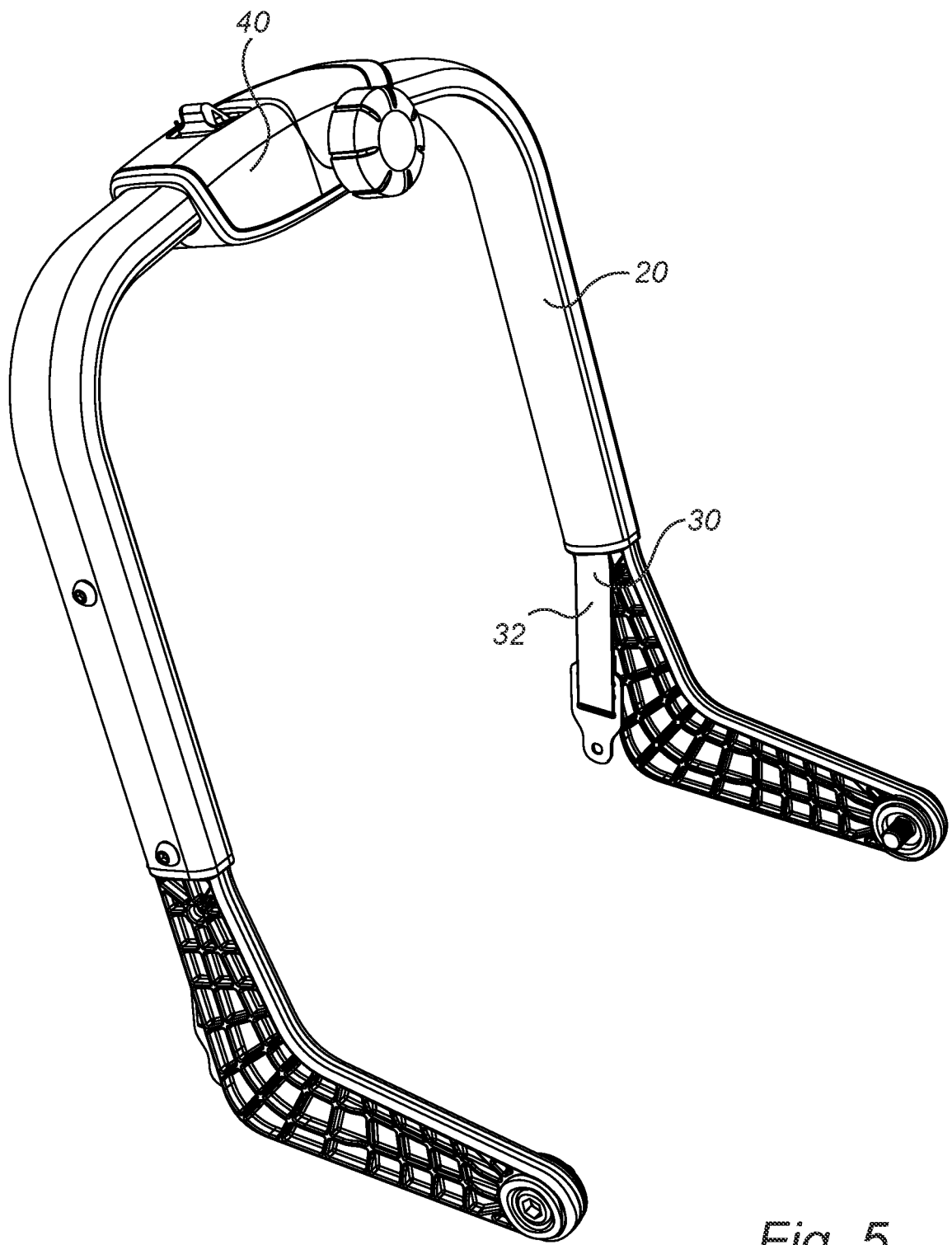
FIG. 5 illustrates the brace of FIG. 2 in a perspective view according to at least one example embodiment of the inventive concept.

FIG. 5 illustrates a brace 20 with tensioning means 30 encompassed within the brace 20. FIG. 5 further illustrates a biasing mechanism 40 coupled to the brace 20. In FIG. 5 a first portion 32 of the tensioning means 30 are arranged outside the brace 20. The end portion of the first portion 32 is arranged to be secured to a base portion 10. The tensioning means 30 secured to the base portion 10 forces the brace 20 in a downward direction.

The invention claimed is:

1. A child safety assembly, comprising:
   a base portion, to be placed on a vehicle seat and for holding a child safety seat,
   a brace, to be pressed against a backrest of the vehicle seat, said brace being connected to said base portion, for preventing said base portion from tilting from the vehicle seat,
   tensioning means, extending from said brace and secured to said base portion, and
   a biasing mechanism, coupled to said tensioning means, wherein said biasing mechanism provides, to said tensioning means, a tension which draws said brace in a direction downwards to said base portion for providing a pressure of said brace against the backrest of the vehicle seat,
   wherein said biasing mechanism comprises a movable component, adapted for rolling up said tensioning means, such that the length of said tensioning means between said movable component and said base portion is shortened, or for unrolling said tensioning means, such that the length of said tensioning means between said movable component and said base portion is extended.

2. A child safety assembly according to claim 1, wherein said movable component is a wheel and wherein said wheel is spring loaded, such that said tensioning means is urged to be automatically rolled up around said wheel.

3. A child safety assembly according to claim 1, wherein said biasing mechanism automatically provides a tension to said tensioning means, and wherein said biasing mechanism further comprises a manual regulator, for additional tensioning of said tensioning means.

4. A child safety assembly according to claim 3, wherein said manual regulator is connected to said movable component, and wherein activation of said manual regulator causes said tensioning means to be further rolled up around said movable component, such that said brace is further drawn in a direction downwards to said base portion and the pressure of said brace against the backrest of the vehicle seat is increased.

5. A child safety assembly according to claim 3, wherein said manual regulator comprises a torque overload protector which, when a predefined torque is reached, decouples the manual regulator from additional tensioning of the tensioning means.

6. A child safety assembly according to claim 3, wherein said manual regulator comprises indicating means, said indicating means giving a response when said predefined torque is reached, such that the user knows when to stop activating said manual regulator, and for preventing overload of said tensioning means.

7. A child safety assembly according claim 6, wherein said indicating means comprises a sound for indication to the user when to stop activating said manual regulator.

8. A child safety assembly according to claim 1, wherein said base portion further comprises:
- a pair of ISOFIX latches, adapted to be connected to a pair of ISOFIX connections of the vehicle seat, and
- a supporting leg, to be supported against the floor of the vehicle.

9. A child safety assembly according to claim 1, wherein said brace is pivotally connected to said base portion at a first location spaced apart from a second location where said tensioning means is secured to said base portion, such that said brace can be tilted towards or away from said base portion.

10. A child safety assembly according to claim 1, wherein said biasing mechanism further comprises a lock, adapted to prevent said tensioning means from being unrolled of said movable component.

11. A child safety assembly according to claim 10, wherein said lock is adapted to be automatically locked and manually unlocked such that a release of said biasing mechanism is controllable by a user.

12. A child safety assembly according to claim 1, wherein said tensioning means comprises at least one strap.

13. A child safety assembly according to claim 1, wherein said tensioning means are at least partly encompassed within said brace.

14. A child safety assembly according to claim 1, wherein said brace is shaped as a tubular profile and wherein said tensioning means are at least partly encompassed within said tubular profile.

* * * * *